United States Patent
Pope et al.

(10) Patent No.: US 6,830,685 B2
(45) Date of Patent: Dec. 14, 2004

(54) FILTERING DEVICE WITH ASSOCIATED SEALING DESIGN AND METHOD

(75) Inventors: Rodney William Pope, Clearfield, UT (US); Eric Wilson Stroup, North Ogden, UT (US); William Kelly Brown, South Weber, UT (US); Danen Lee Petersen, Ogden, UT (US); Olli Tuominen, Marlboro, MA (US); Troy McGhee, North Ogden, UT (US)

(73) Assignee: Fresenius USA, Inc., Lexington, MA (US)

( * ) Notice: Subject to any disclaimer, the term of this patent is extended or adjusted under 35 U.S.C. 154(b) by 0 days.

(21) Appl. No.: 10/007,516

(22) Filed: Dec. 5, 2001

(65) Prior Publication Data

US 2003/0102264 A1 Jun. 5, 2003

(51) Int. Cl.[7] .............................................. B01D 63/00
(52) U.S. Cl. ............................... 210/321.89; 210/321.6; 210/321.61; 210/321.78; 210/321.79; 210/321.8; 210/321.88; 210/500.23
(58) Field of Search .................. 210/321.6, 321.78, 210/321.79, 321.88, 321.89, 232, 500.23, 323.2, 450, 500.13; 95/45; 96/10, 4

(56) References Cited

U.S. PATENT DOCUMENTS

| 4,157,967 A | 6/1979 | Meyst et al. |
| 4,170,056 A | 10/1979 | Meyst et al. |
| 5,192,499 A | 3/1993 | Sakai et al. |
| 5,236,586 A | 8/1993 | Antoni et al. |
| 5,472,601 A | 12/1995 | Eguchi |
| 5,632,894 A | 5/1997 | White et al. |
| 5,922,202 A * | 7/1999 | Elgas et al. .................. 210/456 |
| 6,074,559 A | 6/2000 | Hahmann et al. |
| 6,280,619 B1 * | 8/2001 | Lacy et al. .................. 210/232 |
| 6,432,307 B2 * | 8/2002 | Gizowski et al. ........ 210/321.6 |

FOREIGN PATENT DOCUMENTS

| EP | 0 297 410 A2 | 1/1989 | |
| EP | 0 520 737 A1 | 12/1992 | |
| JP | 10165777 A1 * | 6/1998 | ........... B01D/63/00 |

* cited by examiner

Primary Examiner—W. L. Walker
Assistant Examiner—K S Menon
(74) Attorney, Agent, or Firm—Gibson, Dunn & Crutcher LLP; Stanley J. Gradisar (57) ABSTRACT

A filter device made of less expensive material than comparable filter devices heretofore has basic filter components plus some unique design aspects and an additional ring component. The ring provides an interface inside the filter which enables the potting compound to adhere to the filter and create a seal between a first and second fluid compartment within the filter. An embedded region of the ring possesses a detailed geometry which helps ensure that a delamination would be localized and unable to propagate from the first to the second compartment, maintaining the structural integrity of the filter device. To ensure that the sealing interface remains intact and free from delamination, the ring is subjected to a surface treatment, which modifies the surface energy of the ring. This modified surface energy of the ring allows the hydrophilic potting compound to more effectively bond to the modified hydrophobic ring.

46 Claims, 4 Drawing Sheets

FILTERING DEVICE WITH ASSOCIATED SEALING DESIGN AND METHOD

FIELD OF THE INVENTION

This invention relates to the field of filtering devices, and more particularly, to a hollow fiber type filter device having a single use or disposable design together with a method for using and manufacturing the same.

DETAILED DESCRIPTION OF THE INVENTION

Figure 1:
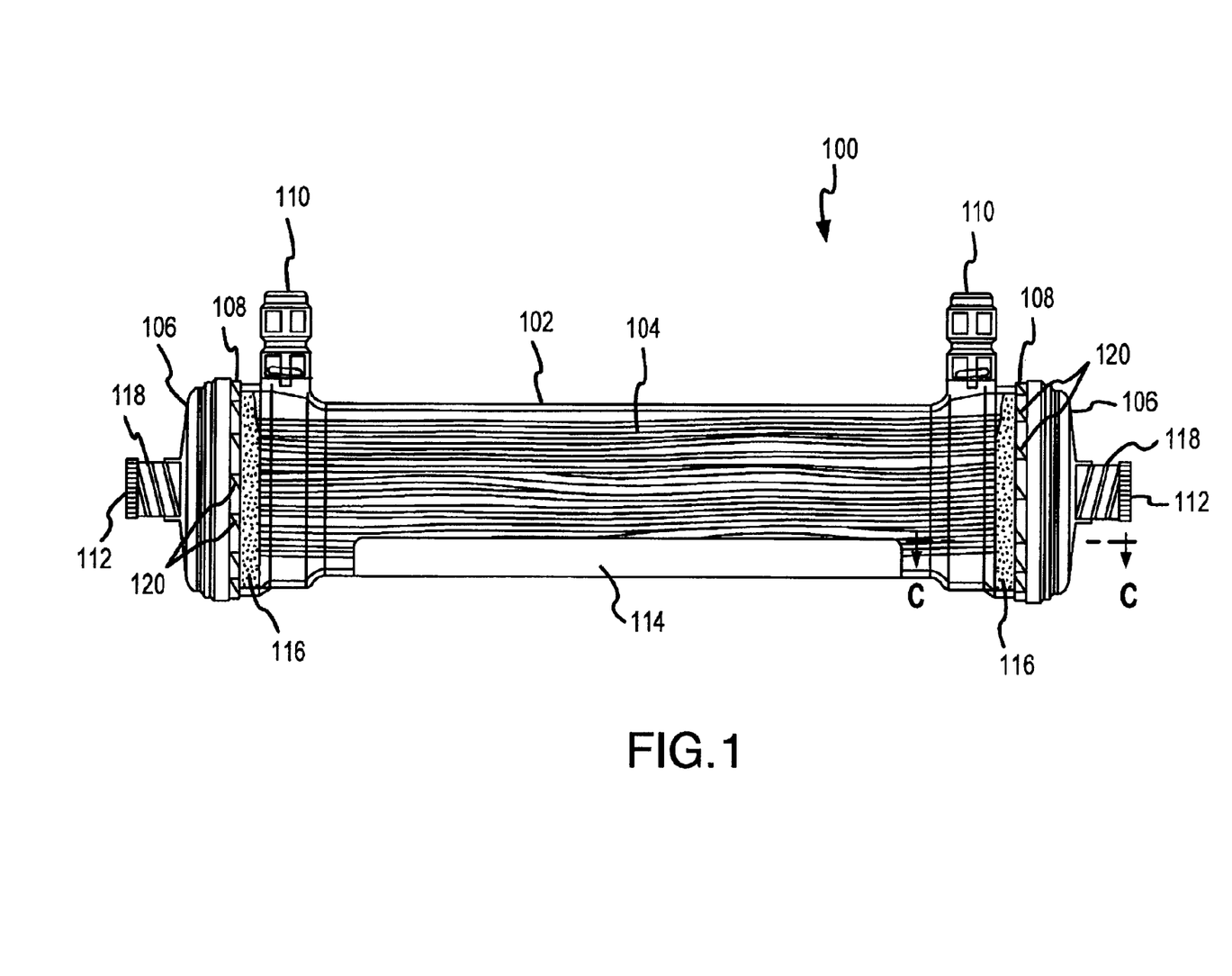
FIG. 1 shows an overall side view of an embodiment of the filter device of the present invention.
Figure 2:
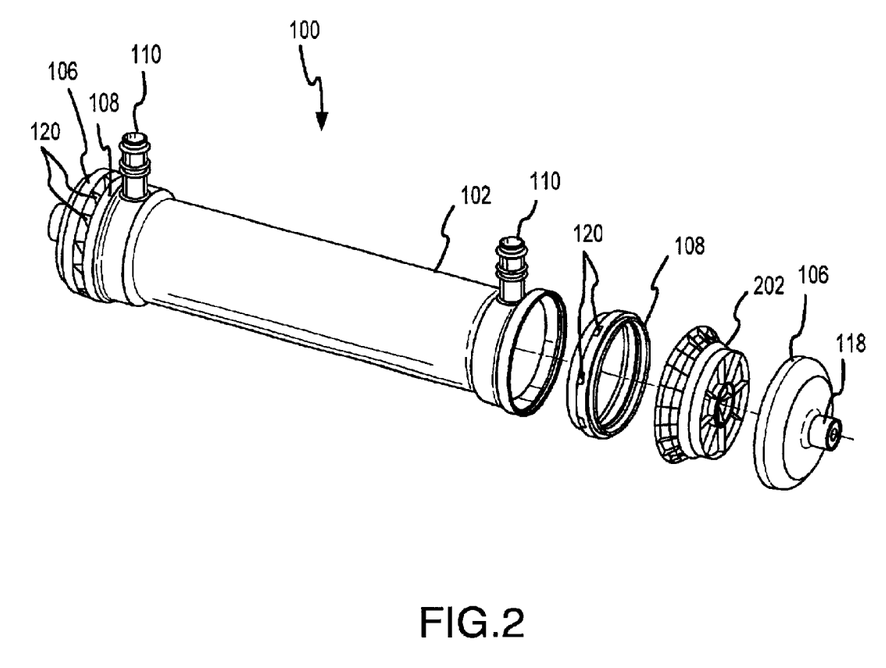
FIG. 2 shows an exploded isometric view of the filter device of FIG. 1 in an embodiment of the present invention.

Referring to the Figures, in which like numerals refer to like portions thereof, FIG. 1 shows an overall side view and FIG. 2 shows an exploded isometric view of an embodiment of the filter device of the present invention. Referring now to FIGS. 1 and 2, Filter Device 100 in this embodiment of the invention is a dialyzer used for hemodialysis. One skilled in the art will recognize that the filter device of the present invention could also be used for filtering other types of fluids besides blood, including, but not limited to water, sewage, or other types of chemical separation.

Filter Device 100 is a dialyzer utilized by patients with kidney disease who suffer from the adverse effects of toxin build-up in their blood. Dialysis is a process which employs an artificial kidney to remove those toxins. In hemodialysis a dialyzer is used which contains a semipermeable membrane dividing the dialyzer into two compartments. Blood is pumped through one compartment and a dialysate solution through the second. As the blood flows by the dialysis fluid, separated by the semipermeable membrane, blood impurities such as urea and creatinine diffuse through the semipermeable membrane into the dialysis solution by diffusion, convection, and absorption. The electrolyte concentration of the dialysis fluid is set so as to maintain electrolytic balance within the patient.

Dialyzers are known in a variety of configurations. The basic concept is to maximize the surface area of the membrane dividing the blood side from the dialysate side, so that the pressure gradient diffusing toxins from the blood side into the dialysate side and diffusing nutrients or pharmacological agents from the dialysate side into the blood side can operate over a wide area. On the other hand, there are size constraints to the overall three dimensional volume of the device, in order to fit into the hemodialysis apparatus.

Filter Device 100 has a large number of Microfibers 104 (not shown in FIG. 2) encased in a Housing 102, which is a hollow cylinder open at both ends. In other designs, Housing 102 may be open only at one end, and Microfibers 104 are looped in a U-shape in Housing 102 such that both open ends of each microfiber are located at the one open end of Housing 102 (not shown). In either design, thousands of the hollow semipermeable Microfibers 104 carry blood in a pathway through one set of open ends of each Microfiber 104, through the interior of each Microfiber 104, and exiting out of the other open end of each Microfiber 104.

As shown in FIG. 1, thousands of the hollow semipermeable Microfibers 104 carry blood in a pathway that enters from one end through a first Blood Inlet/Outlet Port 118 to the opposite end and out through a second Blood Inlet/Outlet Port 118 so that blood flows through the interior of each Microfiber 104 in a first direction. Dialysate Inlet/Outlet Ports 110 are also present on opposite ends of Housing 102. A first Dialysate Inlet/Outlet Port 110 carries dialysate in a pathway into Housing 102, the dialysate flows through Housing 102 in a countercurrent direction to the blood flow and in the space between each Microfiber 104, and a second Dialysate Inlet/Outlet Port 110 carries the dialysate out of Housing 102. The material exchange thus takes place across the semipermeable membrane that is the walls of each Microfiber 104. Label 114 is preprinted and applied after assembly. A Cap 112 screws into each Blood Inlet/Outlet Port 118 after sterilization, and is utilized to ensure an uncontaminated fluid pathway and is typically not removed until the technician is ready to connect the blood lines.

The design of Filter Device 100 produces a high surface area for material exchange in a relatively low volume device. For example, a Filter Device 100 having a 6.3 cm cylindrical diameter and a 25.4 cm length can easily accommodate a bundle of about 12,000 to 13,000 Microfibers 104. If each Microfiber 104 has a 0.60 cm circumference and is 24 cm long, the total surface area of all 12,000–13,000 Microfibers 104 is approximately 180 $cm^2$.

The manufacture of Filter Device 100 begins by joining Rings 108 into each end of Housing 102. Each Ring 108 is then joined to Housing 102. Many different joining techniques may be employed including, but not limited to, spin (friction) welding, laser welding, ultrasonic welding, high frequency welding, gluing, adhesive bonding, solvent bonding, screwing with threads, snap fitting, or any other suitable plastic joining technique. In this embodiment of the invention, spin welding is utilized. A plurality of Nubs 120 spaced apart on the outer surface of Ring 108 constitute the spin welding drive features to assist in the spin welding process. Next, open-ended Housing 102 is filled with a bundle of Microfibers 104 which extend in the longitudinal direction throughout the length of Housing 102 and extending a short distance beyond each end. A Potting Cap 202 (FIG. 2) is attached to each Ring 108 to close off each end of Housing 102. Housing 102 is then positioned in a centrifuge to allow rotation about an axis perpendicular to the central longitudinal axis, wherein the axis of rotation extends through the midpoint of Housing 102. Potting Compound 116 is then injected into Dialysate Inlet/Outlet Ports 110 on each end of Housing 102, is spun in a centrifuge, and the fibers are effectively potted in the dialyzer. Alternatively, each end of Housing 102 may be separately spin welded and injected in a two step process. In one embodiment of the invention, polyurethane is used for Potting Compound 116. Epoxy or any other suitable compound may also be used as a potting material. The centrifugal force produced by the rotation in the centrifuge forces Potting Compound 116 to each end, where it sets and hardens.

Housing 102 is then removed from the centrifuge, and each Potting Cap 202 is removed from each end to expose the hardened Potting Compound 116 encasing the ends of each Microfiber 104. Potting Compound 116 and the encased Microfibers 104 at each end are then cut through in a plane perpendicular to the central longitudinal axis of Housing 102, and the Microfibers 104 longitudinal axes, to expose the interior channels of each Microfiber 104. The result is that the ends of each Microfiber 104 are open for blood flow through the interior channels of each Microfiber 104 extending through Housing 102, but the rest of the space surrounding each Microfiber 104 at both ends of Housing 102 is filled with polyurethane, creating a seal between the blood and dialysate.

After the potting and cutting process, a Flange Cap 106 is attached to each Ring 108 and spin welded together, permanently adhering it to Filter Device 100. This design eliminates an O-ring typically used to assist in the sealing of the blood compartment of a dialyzer.

Dialysate Inlet/Outlet Port 110 in the walls of Housing 102, which are toward but not at the very ends, remain open for dialysate flow there through. A dialysate line is connected to one Dialysate Inlet/Outlet Port 110 and a dialysate return line is connected to the other Dialysate Inlet/Outlet Port 110. The dialysate thus flows through the interior of Housing 102 in the space surrounding the Microfibers 104 in one direction. Blood flows from an arterial blood line from a patient connected to a first Blood Inlet/Outlet Port 118, entering the exposed ends of each Microfiber 104 and flowing through the interior channels through the length of Housing 102 in a countercurrent direction, and then out of the other exposed ends of each Microfiber 104 and back to the patient through a venous blood line connected to a second Blood Inlet/Outlet Port 118. The blood is thus separated from the dialysate by the semipermeable membranes of the microfiber walls, which allow the transfer of liquids, toxins, and nutrients by solute diffusion and pressure gradients.

Typically, dialyzers are reused. After use in a hemodialysis session for a patient, the dialyzer is cleaned and sterilized for subsequent use by the same patient for a next hemodialysis session. The cleansing, sterilizing, storing, and cataloging of each dialyzer to ensure safe use by the same patient is an expensive and laborious task, and fraught with risk should the dialyzer not effectively have had all of the sterilizing chemicals removed from the dialyzer and the patient be exposed to the sterilizing agent itself. Additionally, if the sterilization process was not able to effectively sterilize the dialyzer, the patient may be subjected to a "non' biocompatible medical device. Further logistic risk remain in the case the dialyzers get mixed up and the wrong dialyzer is used with the wrong patient. Heretofore, single use dialyzers have been too expensive to manufacture to be very practicable. To accommodate the growing demands of the hemodialysis market for single use or disposable dialyzers, the design of Filter Device 100 of the present invention has solved the high cost problem associated with the current manufacture of disposable dialyzers, but yet maintain the performance and medical requirements necessary for successful hemodialysis.

Various seals in a dialyzer must remain intact, which is of special concern when replacing the currently proven expensive materials, from which many dialyzers are made, with less expensive materials in order to reduce costs. Any dialyzer inherently has at least two sealing regions in its respective design. First, the blood and dialysate compartments must be sealed from each other to ensure that a blood leak does not occur. The second seal consists of sealing either the blood or dialysate compartment from the exterior of the dialyzer.

In nearly all dialyzers currently marketed throughout the world, polyurethane is used as a potting material to seal to the housing to ensure that the blood and dialysate compartments are sealed from each other. An O-ring is typically used to separate the blood from the exterior of the dialyzer.

The seals in a dialyzer must not only maintain their integrity through a specified shelf life duration and during the dialysis treatment process, but must also maintain their integrity during the manufacturing process.

The Filter Device 100 of the present invention utilizes molded parts, including Housing 102 and Flange Caps 106, made with a polypropylene homopolymer that possess comparable general characteristics to the polycarbonate used in the molded components of the Fresenius Hemoflow series of dialyzers, but is considerably less expensive. The choice of materials for the dialyzer are heavily dependent upon the manufacturing processes employed. Though the optical property of the polypropylene homopolymer is significantly more "hazy" compared to polycarbonate, the blood and dialysate compartments are still readily visible to technicians.

Polyurethane in one embodiment of the invention is used as Potting Compound 116 for Filter Device 100. Instead of an O-ring, a separate Ring 108 molded from polypropylene is utilized. One Ring 108 is spin welded into each end of Housing 102. Flange Caps 106 are then spin welded onto Rings 108 after Filter Device 100 has been potted and cut. Other joining techniques as listed above, including laser welding, may be used instead of spin welding. However, spin welding is based on a very simple concept and the process generally can be performed faster, less expensively, and with much less continuous maintenance and re-alignment as compared to laser welding. The weld joint designs utilized in Filter Device 100 are very robust and conducive to the rigors of large scale manufacturing.

During the potting process, the interior portion of each Ring 108 becomes encased in Potting Compound 116. This creates the first seal between the blood and the dialysate compartments. After potting, the potting caps are removed, the ends are cut, and Flange Caps 106 are spin weld onto Rings 108. The spin welded region constitutes the second seal region, which seals the blood compartment from the outside of Filter Device 100 (a seal which has typically utilized an O-Ring). Filter Device 100 is then conditioned during a low flux conditioning process, and then sterilized. Sterilization may be accomplished in a variety of ways, including ethylene oxide (EtO), steam, or radiation sterilization.

A disadvantage of polypropylene is that its hydrophobic property has a tendency to delaminate from the hydrophilic polyurethane potting material due to the chemistry of surface adhesion between the two materials, resulting in leaks between the blood and dialysate compartments. A two-pronged approach has been taken to solve this delamination problem associated with the use of polypropylene. The first involves building a detailed geometry into the design of Ring 108 to minimize delamination or propagation of the delamination through the creation of physical stops discussed more fully in relation to FIGS. 3A–3D. The second involves the modification of the surface characteristics of the polypropylene to increase adhesion between it and the polyurethane, also discussed more fully in relation to FIGS. 3A–3D.

Figure 3A:
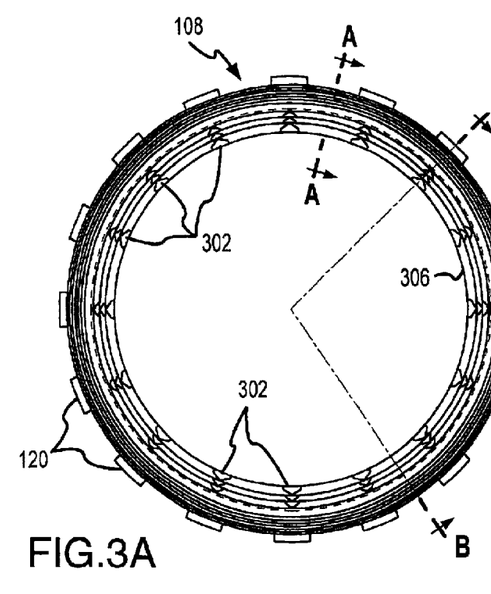
FIGS. 3A–3D show various views of the ring of FIGS. 1 and 2 of an embodiment of the filter device of the present invention.
Figure 3B:
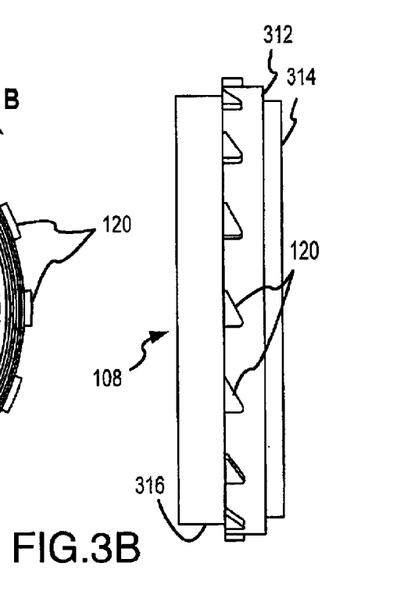
Figure 3C:
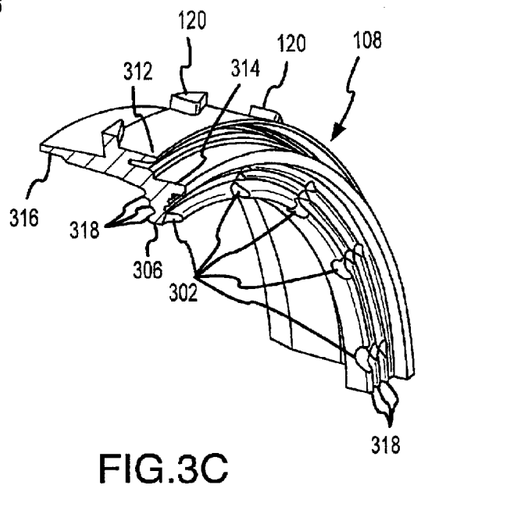

FIGS. 3A–3D show various views of an embodiment of the ring of FIGS. 1 and 2 in an embodiment of the single use dialyzer of the present invention. FIG. 3A shows a front view of Ring 108. FIG. 3B shows a side view of Ring 108. FIG. 3C shows an isometric cross-sectional view of a portion of Ring 108 as seen along lines B—B of FIG. 3A.

Figure 3D:
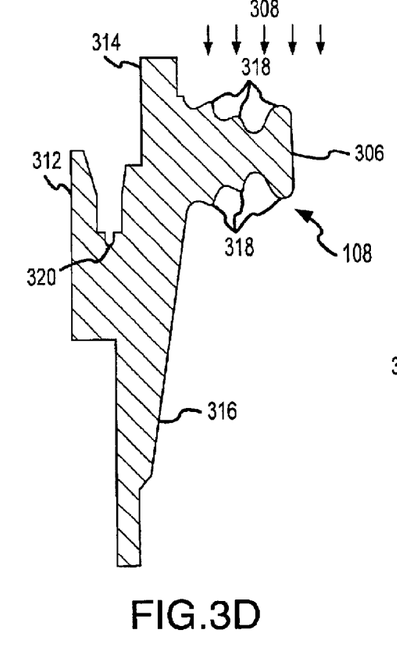

FIG. 3D shows a cross-sectional view of Ring 108 as seen along line A—A of FIG. 3A.

Referring now to FIGS. 3A–3D, Ring 108 is shaped to coincide with Housing 102 and Flange Caps 106 that each Ring 108 is mated with. Typically, Housing 102, Flange Caps 106, and Rings 108 are circular, but other shapes may also be utilized. Ring 108 has Annular Tongue 316 which fits into an annular groove in Housing 102 formed by Annular Inner Lip 410 and Annular Outer Lip 412 in an interference based snap fit fashion in one embodiment of the invention (see FIG. 4). Ring 108 also has Annular Outer Rim 312 and Annular Inner Rim 314 which form an annular groove which is designed to receive Flange Cap 106 in an interference based snap fit (see FIG. 4). Potting Cap 202 used in the manufacturing process (FIG. 2) is also designed to fit into this annular groove.

Several methods are available to treat the surface of Ring 108 to modify its surface energy to increase adhesion between it and the polyurethane, including plasma, corona discharge, and flame treatments. By increasing the ability of the surface of Ring 108 to adhere to the polyurethane, Ring 108 has been shown to be effective in eliminating potential issues regarding delamination. A delamination could potentially allow the two fluid pathways to mix outside of the filtering microfibers. The detailed geometry of the design of Ring 108 increases the surface area treatable through surface treatment, enhancing the effects of modifying the surface energy of Ring 108.

In one embodiment of the invention, a typical surface treatment process which allows for the most practical integration into a clean room automated assembly process is the "corona discharge" surface treatment technique. This treatment method is currently utilized in industry to increase the adhesion of inks, coatings, and adhesives to polyolefins, such as polypropylene. The corona discharge consists of a high voltage electrical discharge that is created between two electrodes across a specified distance. This discharge ionizes the gases present between the electrodes and creates unstable chemical species (mainly free radicals), which possess sufficient energy to initiate bond cleavage at the polymer surface. A small fan is situated just above the corona discharge heads and blows the reactive chemical species onto the polymeric surface of the part being treated, Ring 108, as shown by arrows 308 in FIG. 3D. Ring 108 is especially well suited to accommodate the corona discharge treatment process, presenting a large surface area due to its geometric design. The corona discharge treatment process is based on the surface being treated to be directly exposed to the electrical discharge, and sections of the surface that are not directly in the "line of sight" of the discharge do not receive as effective treatment. Ring 108 is designed to ensure that the polyurethane interface regions of the ring receive optimal amounts of the surface treatment, while also forcing any delamination that may occur to follow a very difficult pathway. Annular Rounded Ridges 318 on the upper and lower surfaces of Annular Anchor 306 have relatively sharp transitions between them to ensure that optimal amounts of "treatable" area of Ring 108 are exposed to the corona discharge treatment process. When this entire section of Ring 108 is embedded in the Potting Compound 116, delamination is forced to essentially "start" again and again after being initiated anywhere along the Ring 108/Potting Compound 116 interface as shown in a close up cross-section of Ring 108, Housing 102, and Flange Cap 106 shown in FIG. 4. The effects of the corona discharge treatment may also be somewhat distributed onto Annular Rounded Ridges 318 in the lower surface of Annular Anchor 306 as the unreacted unstable chemical species will be blown into the center of Ring 108 and react with the lower surface of Ring 108, which also is embedded in Potting Compound 116. The thickness of Annular Anchor 306 tends to decrease or taper inwardly from Annular Outer Rim 312, as opposed to increasing or expanding inwardly, which aids in this surface treatment process.

Covalent bonds are produced on the surface of the polymer as the surface is oxidized during the treatment process. This oxidative coating on the polypropylene surface allows the hydrophilic polyurethane to effectively bond to the modified polypropylene. Because the oxidative coating on the polypropylene has the ability to interact with the oxygen present in the air, and simply the dynamic nature of polymers, the stability of the corona discharge treatment is limited to a specified amount of time. However, once potted, the modified surface of Ring 108 is permanent and does not degrade over time.

A large portion of Ring 108, Annular Anchor 306, serves as a mechanical lock and is located at an interior portion of Ring 108 and is completely embedded in Potting Compound 116. This portion of Ring 108 forces delamination to completely circumvent around and through the Annular Rounded Ridges 318 to create an actual delamination between the blood and dialysate compartments of Filter Device 100 as shown in FIG. 4.

Another feature of Ring 108 are Radial Channels 302. As the polyurethane potting mass "backfills" from the ends of Filter Device 100, the residual air from the ends of Filter Device 100 becomes entrapped due to Annular Rounded Ridges 318 of Annular Anchor 306 portion of the design of Ring 108. Not allowing the potting mass to bind to the corona discharge treated surface because of an air pocket could potentially create an initiation site for a delamination. To address this situation, Radial Channels 302 are periodically notched perpendicular to Annular Rounded Ridges 318 of the upper surface of Annular Anchor 306 of Ring 108, which allows the air to escape and not become trapped during "backfilling" of Potting Compound 116. The upper surface of each Annular Anchor 306 is that surface which faces outward toward the ends of Housing 102.

Figure 4:
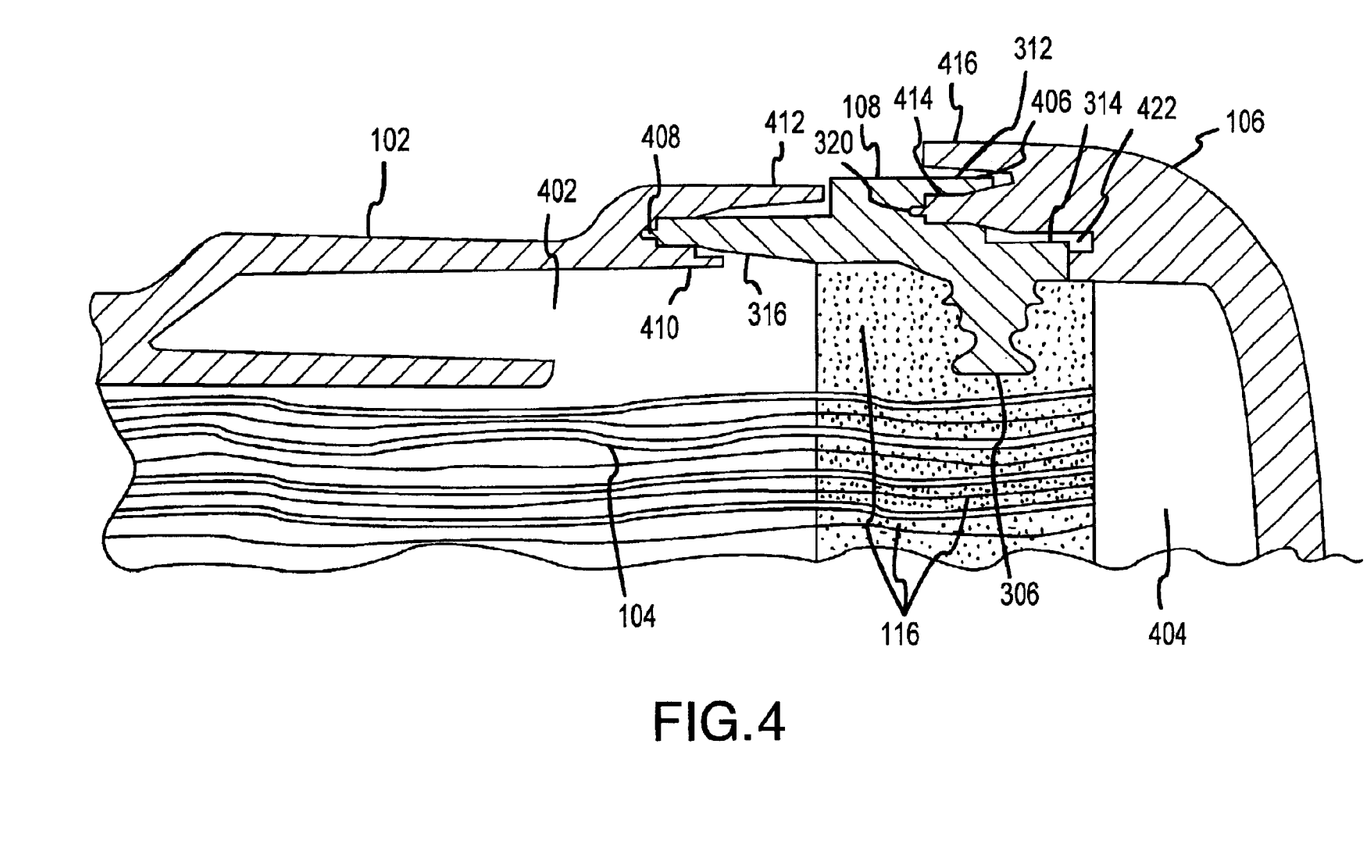
FIG. 4 shows a cross-section view of a portion of the filter device of FIG. 1 in an embodiment of the present invention.

FIG. 4 shows a cross-section view of a portion of the single use dialyzer of FIGS. 1 and 2 in an embodiment of the present invention. Referring now to FIG. 4, Dialysate Compartment 402 and Blood Compartment 404 are the regions of ingress and egress of dialysate and blood through Dialysate Inlet/Outlet Ports 110 and Blood Inlet/Outlet Ports 118 respectively. Annular Inner Lip 410 and Annular Outer Lip 412 of Housing 102 receives Annular Tongue 316 in an interference based snap fit fashion. This connection is spin welded as described above. Typically spin welding of polypropylene does not generally produce extensive spin welding particulate, but material does aggregate around the weld joint in the form of jagged flash (melted polymeric material) which aids in sealing welded parts together. Annular Channel 320 and Annular Channel 408 accommodate the flow of some of the melted flash material that is displaced during the spin welding process.

After the potting and cutting process, in similar fashion Annular Interior Rim 414 and Annular Exterior Rim 416 form an annular groove for receiving Annular Outer Rim 312 of Ring 108. This connection is spin welded as described above. Annular Channel 406 also accommodates the flow of some of the melted material that is displaced during the spin welding process. Annular Channel 422 is a specially designed area where Flange Cap 106 and Ring 108 seal off against each other during the spin welding process, entrapping additional amounts of melted flash material from the spin welding process. This design insures that no flash material is allowed to invade Blood Compartment 404. Blood tends to coagulate on any rough surface exposed within Blood Compartment 404, which would degrade the functioning of Filter Device 100. One skilled in the art will recognize that Annular Channel 422 will also trap residue material from the other types of joining techniques mentioned above. The flat annular portions seal up against each other and ensure that the flash produced will not be introduced into the blood compartment of Filter Device 100. However, the welding occurs only at the designated region and not at the flat annular regions where additional amounts of flash may be generated. Additional regions that are designed to contain spin weld flash, or residue material from other types of joining techniques, are located around the Housing 102/Ring 108 weld interface as Annular Outer Lip 412 extends up from Housing 102 along the exterior of Ring 108, and around the Flange Cap 106/Ring 108 weld interface as Annular Exterior Rim 416 extends down from Flange Cap 106 along the exterior of Ring 108. These areas also minimize the flow of flash, or residue material from other types of joining techniques, outside of Filter Device 100 improving the aesthetic features.

The results of various studies on Filter Device 100 show that the design of Ring 108 provides an excellent surface for the corona discharge treatment prior to potting. Extensive quality and delamination testing from two separate experiments of nearly 600 separate Filter Device 100 samples determined that the current design would have a 0.00% chance of delaminating with an upper binomial confidence level of 0.09%. Extensive testing shows that the design of Filter Device 100 possesses excellent capability of resisting delamination, possesses high performance characteristics, and has significantly reduced manufacturing costs. In addition, the clearance characteristics of Filter Device 100 are among the highest currently available on the market.

Having described the present invention, it will be understood by those skilled in the art that many and widely differing embodiments and applications of the invention will suggest themselves without departing from the scope of the present invention.

What is claimed is:

1. A filter device comprising:
a housing having a first end;
a first ring joinable to said first end wherein said first ring has a first annular anchor on an interior portion of said first ring, wherein said first annular anchor has an upper surface and a lower surface;
a first flange cap joinable to said first ring forming a first seal, wherein said first flange cap is separated from contact with said first end of said housing by said first ring;
a plurality of microfibers extending from said first ring through said housing;
a first potting material encasing said plurality of microfibers at said first ring and encasing said upper surface and said lower surface of said first annular anchor forming a second seal; and
a first plurality of rounded ridges on an upper surface of said first annular anchor and a second plurality of rounded ridges on said lower surface of said first annular anchor;
wherein said first annular anchor receives a surface treatment, wherein said surface treatment modifies a surface energy of said first annular anchor, and further wherein said first and second plurality of rounded ridges on said first annular anchor minimizes a delamination of said first potting material from said first annular anchor, and increases a surface area of said first annular anchor treatable through said surface treatment.

2. The filter device according to claim 1 further comprising:
a second end of said housing opposite said first end;
a second ring joinable to said second end wherein said second ring has a second annular anchor on an interior portion of said second ring; wherein said second annular anchor has an upper surface and a lower surface;
a second flange cap joinable to said second ring forming a third seal;
a second potting material encasing said plurality of microfibers at said second ring and encasing said upper surface and said lower surface of said second annular anchor forming a fourth seal; and
a third plurality of rounded ridges on said upper surface of said second annular anchor and a fourth plurality of rounded ridges on said lower surface of said second annular anchor;
wherein said second annular anchor receives said surface treatment, wherein said surface treatment modifies a surface energy of said second annular anchor, and further wherein said third and fourth plurality of rounded ridges on said second annular anchor minimizes a delamination of said second potting material from said second annular anchor, and increases a surface area of said second annular anchor treatable through said surface treatment.

3. The filter device according to claim 1 further comprising:
a first fluid inlet port through said first flange cap;
a first fluid outlet port through said second flange cap, wherein a first fluid pathway is defined by said first fluid inlet port, said plurality of microfibers, and said first fluid outlet port;
a second fluid inlet port through said housing and proximate to said first end; and
a second fluid outlet port through said housing and proximate to said second end, wherein a second fluid pathway is defined by said second fluid inlet port, a space between said plurality of microfibers, and said second fluid outlet port.

4. The filter device according to claim 1 wherein each of said plurality of microfibers are hollow and semipermeable.

5. The filter device according to claim 2 further comprising:
a first plurality of radial channels perpendicular to said first plurality of rounded ridges on said upper surface of said first annular anchor; and
a second plurality of radial channels perpendicular to said third plurality of rounded ridges on said upper surface of said second annular anchor;
wherein said first and second plurality of radial channels allow air to escape when said first and second potting material is applied to said filter device.

6. The filter device according to claim 1 wherein said first ring is spin welded to said first end, said second ring is spin welded to said second end, said first flange cap is spin welded to said first ring, and said second flange cap is spin welded to said second ring.

7. The filter device according to claim 6 further comprising:
a first plurality of nubs on an outer portion of said first ring; and
a second plurality of nubs on an outer portion of said second ring;
wherein said fist and second plurality of nubs assist in said spin welding.

8. The filter device according to claim 6 further comprising:
at least one annular channel located between said first ring and said first end; and
at least one annular channel located between said second ring and said second end;
wherein each of said at least one annular channel accommodates a flow of flash material during said spin welding.

9. The filter device according to claim 6 further comprising:
at least one annular channel located between said first ring and said first flange cap; and
at least one annular channel located between said second ring and said second flange cap;
wherein each of said at least one annular channel accommodates a flow of flash material during said spin welding.

10. The filter device according to claim 1 wherein said first ring is laser welded to said first end, said second ring is laser welded to said second end, said first flange cap is laser welded to said first ring, and said second flange cap is laser welded to said second ring.

11. The filter device according to claim 1 wherein said housing is cylindrical in shape.

12. A filter device comprising:
a housing having a first end;
a first ring joinable to said first end wherein said first ring has a first annular anchor on an interior portion of said first ring, wherin said first annular anchor has an upper surface and a lower surface;
a first flange cap joinable to said first ring forming a first seal, wherein said first flange cap is separated from contact with said first end of said housing by said first ring;
a plurality of microfibers extending from said first ring through said housing;
a first potting material encasing said plurality of microfibers at said first ring and encasing said first upper surface and said lower surface of said first annular anchor forming a second seal;
a first fluid inlet port through said first flange cap wherein a first portion of a first fluid pathway is defined by said first fluid inlet port and said plurality of microfibers;
a second fluid inlet port through said housing and proximate to said first end wherein a first portion of a second fluid pathway is defined by said second fluid inlet port and a space between said plurality of microfibers; and
a first plurality of rounded ridges on an upper surface of said first annular anchor and a second plurality of rounded ridges on a lower surface of said first annular anchor;
wherein said first annular anchor receives a surface treatment, wherein said surface treatment modifies a surface energy of said first annular anchor, and further wherein said first and second plurality of rounded ridges on said first annular anchor minimizes a delamination of said first potting material from said first annular anchor, and increases a surface area of said first annular anchor treatable through said surface treatment.

13. The filter device according to claim 12 further comprising:
a second end of said housing opposite said first end;
a second ring joinable to said second end wherein said second ring has a second annular anchor on an interior portion of said second ring, wherein said second annular anchor has an upper surface and a lower surface;;
a second flange cap joinable to said second ring forming a third seal;
a second potting material encasing said plurality of microfibers at said second ring and encasing said upper surface and said lower surface of said second annular anchor forming a fourth seal;
a first fluid outlet port through said second flange cap wherein a second portion of said first fluid pathway is defined by said second fluid outlet port and said plurality of microfibers;
a second fluid outlet port through said housing and proximate to said second end wherein a second portion of said second fluid pathway is defined by said second fluid outlet port and said space between said plurality of microfibers; and
a third plurality of rounded ridges on said upper surface of said second annular anchor and a fourth plurality of rounded ridges on said lower surface of said second annular anchor;
wherein said second annular anchor receives said surface treatment, wherein said surface treatment modifies a surface energy of said second annular anchor, and further wherein said third and fourth plurality of rounded ridges on said second annular anchor minimizes a delamination of said second potting material from said second annular anchor, and increases a surface area of said second annular anchor treatable through said surface treatment.

14. The filter device according to claim 12 wherein each of said plurality of microfibers are hollow and semipermeable.

15. The filter device according to claim 13 further comprising:
a first plurality of radial channels perpendicular to said first plurality of rounded ridges on said upper surface of said first annular anchor; and
a second plurality of radial channels perpendicular to said third plurality of rounded ridges on said upper surface of said second annular anchor;
wherein said first and second plurality of radial channels allow air to escape when said first and second potting material is applied to said filter device.

16. The filter device according to claim 12 wherein said first ring is spin welded to said first end, said second ring is spin welded to said second end, said first flange cap is spin welded to said first ring, and said second flange cap is spin welded to said second ring.

17. The filter device according to claim 16 further comprising:
a first plurality of nubs on an outer portion of said first ring; and
a second plurality of nubs on an outer portion of said second ring;
wherein said fist and second plurality of nubs assist in said spin welding.

18. The filter device according to claim 16 further comprising:
   at least one annular channel located between said first ring and said first end; and
   at least one annular channel located between said second ring and said second end;
   wherein each of said at least one annular channel accommodates a flow of flash material during said spin welding.

19. The filter device according to claim 16 further comprising:
   at least one annular channel located between said first ring and said first flange cap; and
   at least one annular channel located between said second ring and said second flange cap;
   wherein each of said at least one annular channel accommodates a flow of flash material during said spin welding.

20. The filter device according to claim 12 wherein said first ring is laser welded to said first end, said second ring is laser welded to said second end, said first flange cap is laser welded to said first ring, and said second flange cap is laser welded to said second ring.

21. The filter device according to claim 12 wherein said housing is cylindrical in shape.

22. A filter device prepared by a process comprising the steps of:
   (a) joining a first ring to a first end of a housing wherein said first ring has a first annular anchor on an interior portion of said first ring, wherein said first annular anchor has an upper surface and a lower surface;
   (b) inserting a plurality of microfibers within said housing that extend to said first ring;
   (c) encasing said plurality of microfibers and said upper surface and said lower surface of said first annular anchor at said first ring with a first potting material forming a first seal;
   (d) joining a first flange cap to said first ring forming a second seal, wherein said first flange cap is separated from contact with said first end of said housing by said first ring;
   (e) forming a first plurality of rounded ridges on an upper surface of said first annular anchor;
   (f) forming a second plurality of rounded ridges on a lower surface of said first annular anchor; and
   (g) treating said first annular anchor with a surface treatment, wherein said surface treatment modifies a surface energy of said first annular anchor, and further wherein said first and second plurality of rounded ridges on said first annular anchor minimizes a delamination of said first potting material from said first annular anchor, and increases a surface area of said first annular anchor treatable through said surface treatment.

23. A filter device prepared by a process according to claim 22 wherein said encasing step (c) further comprises the steps (c1) through (c6):
   (c1) attaching a first potting cap to said first ring to close off said first end;
   (c2) placing said housing in a centrifuge to allow rotation about an axis of rotation perpendicular to a longitudinal axis of said housing, wherein said axis of rotation extends through a midpoint of said housing;
   (c3) injecting said first potting material into said housing proximate to said first end;
   (c4) spinning said housing in said centrifuge causing said first potting material to set and harden, encasing said plurality of microfibers and said upper surface and said lower surface of said first annular anchor at said first ring at said first end forming said first seal;
   (c5) removing said first potting cap; and
   (c6) cutting said first potting material and said plurality of microfibers at said first end through a first plane perpendicular to said longitudinal axis, exposing an interior channel of each of said plurality of microfibers at said first end.

24. A filter device prepared by a process according to claim 22 further comprising the steps of:
   (h) joining a second ring to a second end of said housing wherein said second ring has a second annular anchor on an interior portion of said second ring, wherein said second annular anchor has an upper surface and a lower surface;
   (i) extending said plurality of microfibers within said housing to said second ring;
   (j) encasing said plurality of microfibers and said upper surface and said lower surface of said second annular anchor at said second ring with a second potting material forming a third seal;
   (k) joining a second flange cap to said second ring forming a fourth seal;
   (l) forming a third plurality of rounded ridges on an upper surface of said second annular anchor; and
   (m) forming a fourth plurality of rounded ridges on a lower surface of said second annular anchor; and
   (n) treating said second annular anchor with said surface treatment, wherein said surface treatment modifies a surface energy of said second annular anchor, and further wherein said third and fourth plurality of rounded ridges on said second annular anchor minimizes a delamination of said second potting material from said second annular anchor, and increases a surface area of said second annular anchor treatable through said surface treatment.

25. A filter device prepared by a process according to claim 24 wherein said encasing step (j) further comprises the steps (j1) through (j6):
   (j1) attaching a second potting cap to said second ring to close off said second end;
   (j2) placing said housing in said centrifuge to allow rotation about said axis of rotation perpendicular to said longitudinal axis of said housing, wherein said axis of rotation extends through said midpoint of said housing;
   (j3) injecting said second potting material into said housing proximate to said second end;
   (j4) spinning said housing in said centrifuge causing said second potting material to set and harden, encasing said plurality of microfibers and said upper surface and said lower surface of said second annular anchor at said second ring at said second end of said housing forming said third seal;
   (j5) removing said second potting cap; and
   (j6) cutting said second potting material and said plurality of microfibers at said second end through a second plane perpendicular to said longitudinal axis, exposing said interior channel of each of said plurality of microfibers at said second end.

26. A filter device prepared by a process according to claim 24 wherein said joining steps (a), (d), (h), and (k) further comprise the steps (a1), (d1), (h1), and (k1):

(a1) spin welding said first ring to said first end;
(d1) spin welding said second ring to said second end;
(h1) spin welding said first flange cap to said first ring; and
(k1) spin welding said second flange cap to said second ring.

27. A filter device prepared by a process according to claim 26 further comprising:
   forming a first plurality of nubs on an outer portion of said first ring; and
   forming a second plurality of nubs on an outer portion of said second ring;
   wherein said fist and second plurality of nubs assist in said spin welding.

28. A filter device prepared by a process according to claim 26 further comprising:
   forming at least one annular channel between said first ring and said first end; and
   forming at least one annular channel between said second ring and said second end;
   wherein each of said at least one annular channel accommodates a flow of flash material during said spin welding.

29. A filter device prepared by a process according to claim 26 further comprising:
   forming at least one annular channel between said first ring and said first flange cap; and
   forming at least one annular channel between said second ring and said second flange cap;
   wherein each of said at least one annular channel accommodates a flow of flash material during said spin welding.

30. A filter device prepared by a process according to claim 24 wherein said joining steps (a), (d), (h), and (k) further comprise the steps (a1), (d1), (h1), and (k1):
   (a1) laser welding said first ring to said first end;
   (d1) laser welding said second ring to said second end;
   (h1) laser welding said first flange cap to said first ring; and
   (k1) laser welding said second flange cap to said second ring.

31. A filter device prepared by a process according to claim 22 further comprising:
   forming a first fluid inlet port in said first flange cap;
   forming a first fluid outlet port in said second flange cap;
   forming a second fluid inlet port through said housing and proximate to said first end; and
   forming a second fluid outlet port through said housing and proximate to said second end;
   wherein a first fluid pathway is defined by said first fluid inlet port, said plurality of microfibers, and said first fluid outlet port; and
   further wherein a second fluid pathway is defined by said second fluid inlet port, a space between said plurality of microfibers, and said second fluid outlet port.

32. A filter device prepared by a process according to claim 24 further comprising:
   notching a first plurality of radial channels perpendicular to said first plurality of rounded ridges on said upper surface of said first annular anchor; and
   notching a second plurality of radial channels perpendicular to said third plurality of rounded ridges on said upper surface of said second annular anchor;
   wherein said first and second plurality of radial channels allow air to escape when said first and second potting material is applied to said filter device.

33. A filter device comprising:
   a housing having a first end;
   a first ring joinable to said first end wherein said first ring has a first annular anchor on an interior portion of said first ring, wherein said first annular anchor has an upper surface and a lower surface, and further wherein said first annular anchor receives a surface treatment, wherein said surface treatment modifies a surface energy of said first annular anchor;
   a first flange cap joinable to said first ring forming a first seal, wherein said first flange cap is separated from contact with said first end of said housing by said first ring;
   a plurality of microfibers extending from said first ring through said housing;
   a first potting material encasing said plurality of microfibers at said first ring and encasing said upper surface and said lower surface of said first annular anchor forming a second seal; and
   a first plurality of rounded ridges on an upper surface of said first annular anchor and a second plurality of rounded ridges on a lower surface of said first annular anchor;
   wherein said first and second plurality of rounded ridges on said first annular anchor minimizes a delamination of said first potting material from said first annular anchor, and increases a surface area of said first annular anchor treatable through said surface treatment.

34. The filter device according to claim 33 further comprising:
   a second end of said housing opposite said first end;
   a second ring joinable to said second end wherein said second ring has a second annular anchor on an interior portion of said second ring, wherein said second annular anchor has an upper surface and a lower surface, and further wherein said second annular anchor receives said surface treatment, wherein said surface treatment modifies a surface energy of said second annular anchor;
   a second flange cap joinable to said second ring forming a third seal;
   a second potting material encasing said plurality of microfibers at said second ring and encasing said upper surface and said lower surface of said second annular anchor forming a fourth seal; and
   a third plurality of rounded ridges on said upper surface of said second annular anchor and a fourth plurality of rounded ridges on said lower surface of said second annular anchor;
   wherein said third and fourth plurality of rounded ridges on said second annular anchor minimizes a delamination of said second potting material from said second annular anchor, and increases a surface a surface area of said second annular anchor treatable through said surface treatment.

35. The filter device according to claim 34 further comprising:
   a first fluid inlet port through said first flange cap;
   a first fluid outlet port through said second flange cap, wherein a first fluid pathway is defined by said first fluid inlet port, said plurality of microfibers, and said first fluid outlet port;

a second fluid inlet port through said housing and proximate to said first end; and a second fluid outlet port through said housing and proximate to said second end, wherein a second fluid pathway is defined by said second fluid inlet port, a space between said plurality of microfibers, and said second fluid outlet port.

36. The filter device according to claim 34 further comprising:

a first plurality of radial channels perpendicular to said first plurality of rounded ridges on said upper surface of said first annular anchor; and a second plurality of radial channels perpendicular to said third plurality of rounded ridges on said upper surface of said second annular anchor;

wherein said first and second plurality of radial channels allow air to escape when said first and second potting material is applied to said filter device.

37. A filter device comprising:

a housing having a first end;

a first ring joinable to said first end wherein said first ring has a first annular anchor on an interior portion of said first ring;

a first plurality of rounded ridges on an upper surface of said first annular anchor and a second plurality of rounded ridges on a lower surface of said first annular anchor;

a first flange cap joinable to said first ring forming a first seal, wherein said first flange cap is separated from contact with said first end of said housing by said first ring;

a plurality of microfibers extending from said first ring through said housing; and a first potting material encasing said plurality of microfibers at said first ring, and encasing said first plurality of rounded ridges on said upper surface and said second plurality of rounded ridges on said lower surface of said first annular anchor, forming a second seal;

wherein said first and second plurality of rounded ridges on said first annular anchor minimizes a delamination of said first potting material from said first annular anchor.

38. The filter device according to claim 37 further comprising:

a second end of said housing opposite said first end;

a second ring joinable to said second end wherein said second ring has a second annular anchor on an interior portion of said second ring;

a third plurality of rounded ridges on an upper surface of said second annular anchor and a fourth plurality of rounded ridges on a lower surface of said second annular anchor;

a second flange cap joinable to said second ring forming a third seal; and a second potting material encasing said plurality of microfibers at said second ring, and encasing said third plurality of rounded ridges on said upper surface and said fourth plurality of rounded ridges on said lower surface of said second annular anchor, forming a fourth seal;

wherein said third and fourth plurality of rounded ridges on said second annular anchor minimizes a delamination of said second potting material from said second annular anchor.

39. The filter device according to claim 38 further comprising:

a first fluid inlet port through said first flange cap;

a first fluid outlet port through said second flange cap, wherein a first fluid pathway is defined by said first fluid inlet port, said plurality of microfibers, and said first fluid outlet port;

a second fluid inlet port through said housing and proximate to said first end; and a second fluid outlet port through said housing and proximate to said second end, wherein a second fluid pathway is defined by said second fluid inlet port, a space between said plurality of microfibers, and said second fluid outlet port.

40. The filter device according to claim 38 further comprising:

a first plurality of radial channels perpendicular to said first plurality of rounded ridges on said upper surface of said first annular anchor; and a second plurality of radial channels perpendicular to said third plurality of rounded ridges on said upper surface of said second annular anchor;

wherein said first and second plurality of radial channels allow air to escape when said first and second potting material is applied to said filter device.

41. The filter device according to claim 38 wherein said first annular anchor and said second annular anchor receive a surface treatment, wherein said surface treatment modifies a surface energy of said first and second plurality of rounded ridges on said first annular anchor and said third and fourth plurality of rounded ridges on said second annular anchor, and further wherein said first and second plurality of rounded ridges and said third and fourth plurality of rounded ridges increases a surface area of said first and second annular anchors treatable through said surface treatment.

42. A filter device comprising:

a housing having a first end;

a first ring joinable to said first end wherein said first ring has a first annular anchor on an interior portion of said first ring, wherein said first annular anchor has an upper surface and a lower surface;

a first flange cap joinable to said first ring forming a first seal, wherein said first flange cap is separated from contact with said first end of said housing by said first ring;

a plurality of microfibers extending from said first ring through said housing;

a first potting material encasing said plurality of microfibers at said first ring and encasing said upper surface and said lower surface of said first annular anchor forming a second seal;

at least one annular channel located between said first ring and said first flange cap wherein each of said at least one annular channel accommodates a residue material during said joining of said first flange cap to said first ring; and a first plurality of rounded ridges on an upper surface of said first annular anchor and a second plurality of rounded ridges on a lower surface of said first annular anchor;

wherein said first annular anchor receives a surface treatment, wherein said surface treatment modifies a surface energy of said first annular anchor, and further wherein said first and second plurality of rounded ridges on said first annular anchor minimizes a delamination of said first potting material from said first annular anchor, and increases a surface area of said first annular anchor treatable through said surface treatment.

43. The filter device according to claim 42 further comprising:
   a second end of said housing opposite said first end;
   a second ring joinable to said second end wherein said second ring has a second annular anchor on an interior portion of said second ring, wherein said second annular anchor has an upper surface and a lower surface;
   a second flange cap joinable to said second ring forming a third seal;
   a second potting material encasing said plurality of microfibers at said second ring and encasing said upper surface and said lower surface of said second annular anchor forming a fourth seal;
   at least one annular channel located between said second ring and said second flange cap wherein each of said at least one annular channel accommodates a residue material during said joining of said second flange cap to said second ring; and
   a third plurality of rounded ridges on said upper surface of said second annular anchor and a fourth plurality of rounded ridges on said lower surface of said second annular anchor;
   wherein said second annular anchor receives said surface treatment, wherein said surface treatment modifies a surface energy of said second annular anchor, and further wherein said third and fourth plurality of rounded ridges on said second annular anchor minimizes a delamination of said second potting material from said second annular anchor, and increases a surface area of said second annular anchor treatable through said surface treatment.

44. The filter device according to claim 43 further comprising:
   a first fluid inlet port through said first flange cap;
   a first fluid outlet port through said second flange cap, wherein a first fluid pathway is defined by said first fluid inlet port, said plurality of microfibers, and said first fluid outlet port;
   a second fluid inlet port through said housing and proximate to said first end; and
   a second fluid outlet port through said housing and proximate to said second end, wherein a second fluid pathway is defined by said second fluid inlet port, a space between said plurality of microfibers, and said second fluid outlet port.

45. The filter device according to claim 43 further comprising:
   at least one annular channel located between said first ring and said first end; and
   at least one annular channel located between said second ring and said second end;
   wherein each of said at least one annular channel accommodates a residue material during said joining of said second ring to said second end.

46. The filter device according to claim 43 further comprising:
   a first plurality of radial channels perpendicular to said first plurality of rounded ridges on said upper surface of said first annular anchor; and
   a second plurality of radial channels perpendicular to said third plurality of rounded ridges on said upper surface of said second annular anchor;
   wherein said first and second plurality of radial channels allow air to escape when said first and second potting material is applied to said filter device.

* * * * *

UNITED STATES PATENT AND TRADEMARK OFFICE
CERTIFICATE OF CORRECTION

PATENT NO. : 6,830,685 B2
DATED : December 14, 2004
INVENTOR(S) : Pope et al.

It is certified that error appears in the above-identified patent and that said Letters Patent is hereby corrected as shown below:

Column 7,
Line 61, delete the word "an" and replace with the word -- said --.

Column 9,
Line 7, delete the word "fist" and replace with the word -- first --.
Line 47, delete the second occurrence of the word "first".
Line 57, delete the word "an" and replace with the word -- said --.
Line 59, delete the word "a" and replace with the word -- said --.

Column 10,
Line 65, delete the word "fist" and replace with the word -- first --.

Column 13,
Line 13, delete the word "fist" and replace with the word -- first --.

Column 14,
Line 23, delete the word "an" and replace with the word -- said --.
Line 25, delete the word "a" and replace with the word -- said --.

Column 16,
Line 57, delete the word "an" and replace with the word -- said --.
Line 59, delete the word "a" and replace with the word -- said --.

Signed and Sealed this

Nineteenth Day of April, 2005

JON W. DUDAS
*Director of the United States Patent and Trademark Office*